(12) United States Patent
Guetter et al.

(10) Patent No.: US 11,210,782 B2
(45) Date of Patent: Dec. 28, 2021

(54) SYSTEM AND METHOD FOR GENERATING SELECTIVE STAIN SEGMENTATION IMAGES FOR CELL TYPES OF INTEREST

(71) Applicant: VENTANA MEDICAL SYSTEMS, INC., Tucson, AZ (US)

(72) Inventors: Christoph Guetter, Tucson, AZ (US); Kien Nguyen, Tucson, AZ (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

(21) Appl. No.: 16/904,223

(22) Filed: Jun. 17, 2020

(65) Prior Publication Data

US 2020/0320699 A1 Oct. 8, 2020

Related U.S. Application Data

(63) Continuation of application No. PCT/EP2018/086040, filed on Dec. 20, 2018.

(60) Provisional application No. 62/609,748, filed on Dec. 22, 2017.

(51) Int. Cl.
| | |
|---|---|
| *G06K 9/00* | (2006.01) |
| *G06T 7/00* | (2017.01) |
| *G06T 7/162* | (2017.01) |
| *G06T 7/12* | (2017.01) |
| *G06K 9/62* | (2006.01) |

(52) U.S. Cl.
CPC .......... *G06T 7/0012* (2013.01); *G06K 9/6215* (2013.01); *G06T 7/12* (2017.01); *G06T 7/162* (2017.01); *G06T 2207/10024* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 7,933,435 | B2 * | 4/2011 | Hunter | G06T 7/155 |
| | | | | 382/128 |
| 2013/0301898 | A1 * | 11/2013 | Jain | G06T 7/0012 |
| | | | | 382/133 |
| 2017/0213067 | A1 | 7/2017 | Padmanabhan et al. | |

FOREIGN PATENT DOCUMENTS

| | | | |
|---|---|---|---|
| JP | 2017509871 A | 4/2017 | |
| WO | 2014172527 | 10/2014 | |
| WO | WO-2015124777 A1 * | 8/2015 | ........... G06T 7/0012 |

(Continued)

OTHER PUBLICATIONS

PCT/EP2018/086040, "International Search Report and Written Opinion", dated Feb. 22, 2019, 10 pages.

(Continued)

*Primary Examiner* — Soo Jin Park
(74) *Attorney, Agent, or Firm* — Kilpatrick Townsend & Stockton LLP

(57) ABSTRACT

An image analysis system and method to generate selective stain segmentation images for at least one cell type of interest within a stained tissue image are presented. Cell membranes in the tissue image are detected to generate a corresponding membrane mask image. Cell nuclei are classified to generate a classified cells image. Selective stain segmentation images are generated for the at least one cell type of interest based on the membrane mask image and the classified cells image.

20 Claims, 8 Drawing Sheets
(5 of 8 Drawing Sheet(s) Filed in Color)

(56) References Cited

FOREIGN PATENT DOCUMENTS

| WO | 2015177268 | 11/2015 |
| WO | 2016075096 | 5/2016 |

OTHER PUBLICATIONS

Ficarra, et al., *Automated Segmentation of Cells with IHC Membrane Staining*, IEEE Transactions on Biomedical Engineering, vol. 58, Issue 5, pp. 1421-1429, May 2011.
Japan Application No. JP2020-533818 received an Office Action dated Oct. 4, 2021, 8 page (4 pages of English Translation, 4 pages Original Office Action).

\* cited by examiner

700

800

SYSTEM AND METHOD FOR GENERATING SELECTIVE STAIN SEGMENTATION IMAGES FOR CELL TYPES OF INTEREST

CROSS REFERENCE TO RELATED APPLICATIONS

The present application is a continuation of International Application PCT/EP2018/086040, entitled "System And Method For Generating Selective Stain Segmentation Images For Cell Types Of Interest" and filed Dec. 20, 2018, which claims priority to U.S. Provisional Patent Application No. 62/609,748, filed on Dec. 22, 2017. Each of these applications is hereby incorporated by reference in its entirety for all purposes.

BACKGROUND

Field of the Disclosure

The present disclosure generally relates to digital image processing methods and systems for medical diagnosis. Particularly, the present disclosure relates to the preparation of selective stain segmentation images for specific cell types of interest.

Description of Related Art

In the analysis of biological specimens such as tissue sections, blood, cell cultures and the like, biological specimens are mounted on slides and stained with one or more combinations of stain and biomarkers, and the resulting assay is viewed or imaged for further analysis. An assay may include biological specimens such as tissue sections from human subjects that are treated with a stain containing a fluorophore or chromogen conjugated to an antibody which binds to protein, protein fragments, or other targets in the specimens. Observing the assay enables a variety of processes, including diagnosis of disease, assessment of response to treatment, and development of new drugs to fight diseases.

Upon scanning the assay, multiple information channels of image data including color channels are derived, with each observed channel comprising a mixture of multiple signals. One of the most common examples of assay staining is the Hematoxylin-Eosin (H&E) staining, which includes two stains that help identify tissue anatomy information. The H-stain mainly stains the cell nuclei with a generally blue color, while the E-stain acts mainly as a cytoplasmic generally pink stain. A special staining assay may identify target substances in the tissue based on their chemical character, biological character, or pathological character.

An immunohistochemistry (IHC) assay includes one or more stains conjugated to an antibody that binds to protein, protein fragments, or other structures of interest in the specimen, hereinafter referred to as targets or objects of interest. The antibodies and other compounds (or substances) that bind a target in the specimen to a stain, are referred to herein as biomarkers.

For an H&E or a special staining assay, biomarkers have a fixed relationship to a stain (e.g., Hematoxylin counterstain), whereas for an IHC assay, a choice of stain may be used for a biomarker to develop and create a new assay. Biological specimens are prepared according to an assay before imaging. Upon applying a single light source, a series of multiple light sources, or any other source of input spectra to the tissue, the assay can be assessed by an observer, typically through a microscope, or image data can be acquired from the assay for further processing.

In such an acquisition, multiple information channels of image data, for example color channels, are derived, with each observed channel comprising a mixture of multiple signals. Processing of this image data can include methods of color deconvolution also referred to as spectral unmixing, color separation, etc., that are used to determine a local concentration of specific stains from the observed channel or channels of image data. For image data processed by automated methods, depicted on a display, or for an assay viewed by an observer, a relation may be determined between the local appearance of the stained tissue and the applied stains and biomarkers to determine a model of the biomarker distribution in the stained tissue.

An important area in digital image analysis in the healthcare field is the ability to identify and quantify staining for analytes of interest in specific subcellular locations. Algorithms for doing such analyses currently exist. For example, algorithms are currently known for detecting membrane expression of HER2 and cMET. These algorithms rely on nuclei detection to search for stained membrane on a local neighborhood around nuclei, using a predefined threshold to define the neighborhood around the nuclei to be searched for membrane regions. Hence, if these algorithms miss the nuclei or if the membrane lies outside the predefined neighborhood radius, stained membrane around them might not be detected. Additionally, the algorithms might ignore regions that contain membrane staining in combination with other staining compartments (such as cytoplasmic staining) Thus, quantification of staining using these methods could be incomplete or incorrect.

FIG. 5 illustrates an exemplary input image 210 of a Diaminobenzidine (DAB)-stained (e.g., brown color, 512) tissue slide. Currently, professionals rely on similar input images to classify the various cells and to provide a subjective slide scoring result therefor. However, it should be appreciated that the various cells in input image 210 look intermixed within DAB stain, thus rendering the cells of a particular class of interest visually indistinguishable from the remaining cells in other classes.

Although numerous approaches to cell detection and classification that have been presented in the field are capable of providing a certain level of contextual data for the cells, there still remains a long-felt need for a more accurate classification of the cells, particularly in membrane-stained tissue images, in order to improve the whole slide scoring result. Furthermore, with the availability of multiple markers in the traditional brightfield imaging or the newer multiplexed imaging, it becomes ever more important to accurately separate those parts of the membrane stain that belong to a specific type of cells. This will have a direct application in the context of personalized medicine or healthcare where specific markers or a combination thereof may have differing implications depending on the patient.

SUMMARY

The present disclosure addresses the foregoing concern by providing, inter alia, a digital image analysis system and method for the generation of selective stain segmentation images for specific cell types of interest. More specifically, the present digital image analysis system includes a digital storage medium that stores digitally encoded, non-transitory computer-readable instructions for execution by one or more processors, in order to implement the method of the present disclosure.

In one embodiment, the cell membranes associated with specific types of cells, such as tumor cell or immune cells, are distinctly segmented, in order to improve the computation of a whole slide scoring result. For example, in the PDL1 scoring method, the pathologist will be able to better score the slide using selectively stained mask images that correspond to specific cell types of interest.

To this end, the image analysis system generates stain segmentation images for selected cell types of interest within a stained tissue image, and provides a visual image analysis of the generated selective stain segmentation images. It generally includes a membrane mask generation engine that can, among other things, detect cells in the tissue image, in order to generate a corresponding membrane mask image. It also includes a cell classification engine, which can, among other things, classify the cells in the tissue image and generate a classified cells image of the cells. In some embodiments, the cell classification engine can, prior to classifying the cells, run any suitable cell detection algorithm to detect the cells. In other embodiments, the cell classification engine can obtain cell detection results from another engine. In yet other embodiments, the cell classification engine can classify the cells without first detecting them, for example, using a trained neural network or another machine learning (e.g., deep learning) approach. The image analysis system can also include a selective stain segmentation engine can then generate selective stain segmentation images for the cell types of interest, based on the membrane mask image and the classified cells image of the cells.

The selective stain segmentation engine is capable of locating classified cells of interest within the membrane mask image, and of defining membrane borders between the classified cells of interest and other cells by splitting shared membrane components between neighboring cells. As an illustrative example, the selective stain segmentation engine is capable of splitting the shared membrane components between the neighboring cells based on a Voronoi diagram.

The selective stain segmentation images can be used to generate at least one stain mask image for the cell types of interest. Upon review of the stain mask image by a professional, the input digital image of the slide can be scored with a confidence score that reflects the likelihood that the cells belong to the cell types being investigated. The output of the selective stain segmentation engine can then be stored in a database.

The image analysis system described herein can enable or facilitate the visualization of the image analysis results in whole slide imaging or field-of-view (FOV)-based imaging to further support pathologists and other medical professionals in their review and analysis of tissue images. In one embodiment, it enables the separation of a multitude of biomarker stains in digital pathology tissue slides.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The various features of the present disclosure and the manner of attaining them will be described in greater detail with reference to the following description, claims, and drawings wherein:

Figure 1:
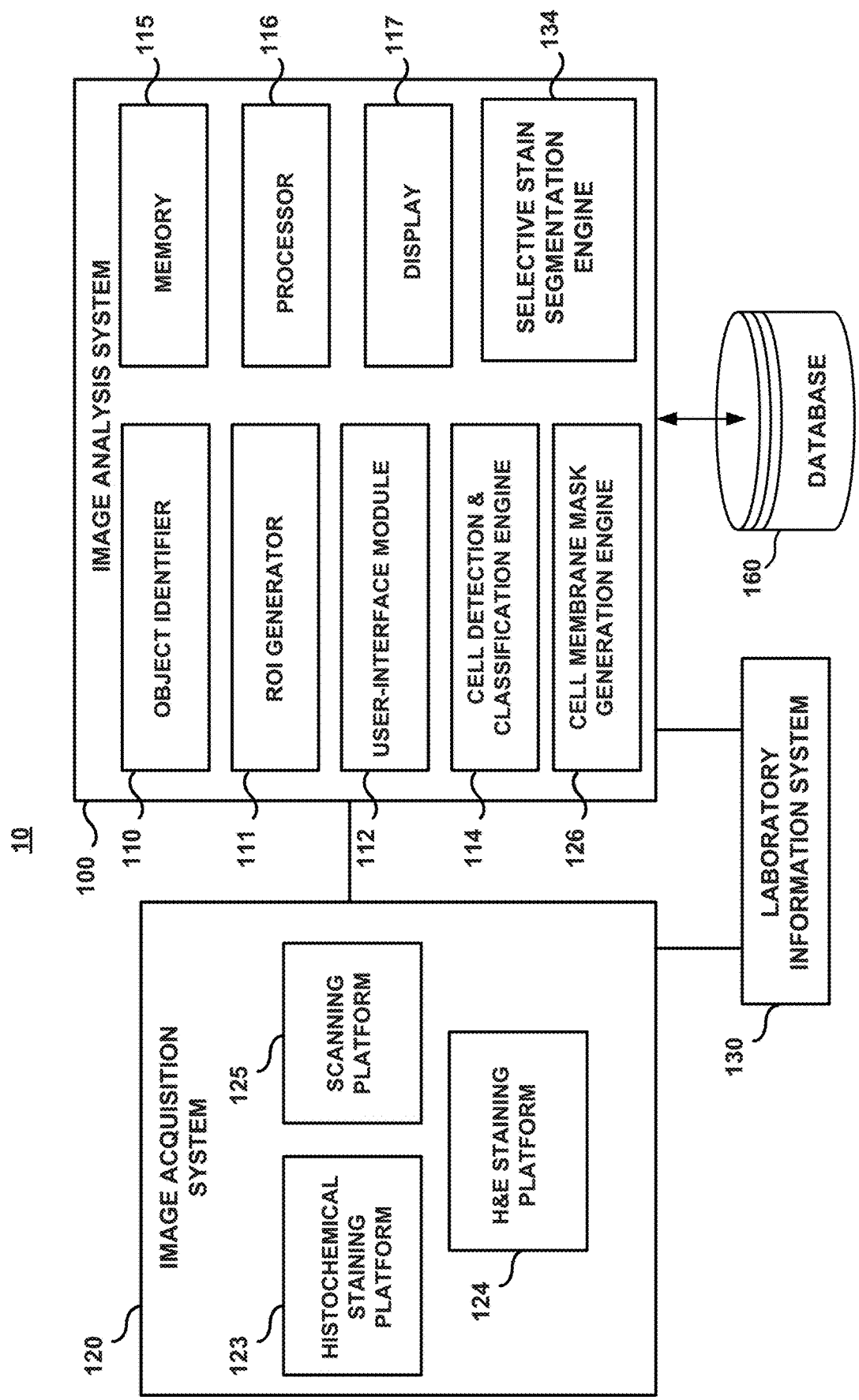
FIG. 1 depicts a computer-based cellular detection system that is adapted to generate selective stain segmentation images for specific cell types of interest, in accordance with an exemplary embodiment of the subject disclosure.

It will be appreciated that for simplicity and clarity of illustration, reference numbers may be reused among the figures to indicate corresponding or analogous features.

DETAILED DESCRIPTION

I-Definitions

Unless defined otherwise, technical and scientific terms used herein have the same meaning as commonly understood by a person of ordinary skill in the art. See, e.g., Lackie, DICTIONARY OF CELL AND MOLECULAR BIOLOGY, Elsevier (4th ed. 2007); Sambrook et al., MOLECULAR CLONING, A LABORATORY MANUAL, Cold Springs Harbor Press (Cold Springs Harbor, N.Y. 1989).

Antibody: The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

Biomarker: As used herein, the term "biomarker" shall refer to any molecule or group of molecules found in a biological sample that can be used to characterize the biological sample or a subject from which the biological sample is obtained. For example, a biomarker may be a molecule or group of molecules whose presence, absence, or relative abundance is:

characteristic of a particular cell or tissue type or state;
  characteristic of a particular pathological condition or state; or
  indicative of the severity of a pathological condition, the likelihood of progression or regression of the pathological condition, and/or the likelihood that the pathological condition will respond to a particular treatment. As another example, the biomarker may be a cell type or a microorganism (such as bacteria, mycobacteria, fungi, viruses, and the like), or a substituent molecule or group of molecules thereof As intended herein, biomarker imaging includes, without limitation, multiplexed tissue biomarker imaging.

Biomarker-specific reagent: A specific detection reagent that is capable of specifically binding directly to one or more biomarkers in the cellular sample, such as a primary antibody.

Cell detection: Automated process of a computer to identify the location of a particular cell in an image.

Cellular sample: As used herein, the term "cellular sample" refers to any sample containing intact cells, such as cell cultures, bodily fluid samples or surgical specimens taken for pathological, histological, or cytological interpretation. A biological sample can be a tissue or a cell sample. The source of the tissue or cell sample may be solid tissue as from a fresh, frozen and/or preserved organ or tissue sample or biopsy or aspirate; blood or any blood constituents; bodily fluids such as cerebral spinal fluid, amniotic fluid, peritoneal fluid, or interstitial fluid; cells from any time in gestation or development of the subject. The cellular sample can also be obtained from in vitro tissue or cell culture. The cellular sample may contain compounds which are not naturally intermixed with the cells in nature such as preservatives, anticoagulants, buffers, fixatives, nutrients, antibiotics, or the like. Examples of cellular samples herein include, but are not limited to, tumor biopsies, circulating tumor cells, serum or plasma, primary cell cultures or cell lines derived from tumors or exhibiting tumorlike properties, as well as preserved tumor samples, such as formalin-fixed, paraffin-embedded tumor samples or frozen tumor samples.

Computer program: Also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Computing system: Also referred to as computer, includes any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Counterstain: A stain with color contrasting to the principal stain, making the stained object more readily detectable. For example, eosin counterstain to hematoxylin in an H&E stain.

Cytoplasmic staining: A group of pixels arranged in a pattern bearing the morphological characteristics of a cytoplasmic region of a cell.

Marker: A stain, dye, or a tag that allows a biomarker to be differentiated from ambient tissue and/or from other biomarkers. The term "biomarker" may be understood in the sense of a tissue feature, such as the presence of a particular cell type, for instance immune cells, and more particularly, a tissue feature indicative of a medical condition. The biomarker may be identifiable by the presence of a particular molecule, for instance a protein, in the tissue feature.

Membrane/punctate region: A region in which diffuse membrane staining is intermixed with punctate staining.

Processor: Encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Punctate staining: A group of pixels with strong localized intensity of staining appearing as spots/dots scattering on the membrane area of the cell.

Sample: As used herein, the term "sample" shall refer to any material obtained from an object or target capable of being tested for the presence or absence of a biomarker.

Stain: When used as a noun, the term "stain" shall refer to any substance that can be used to visualize specific molecules or structures in a cellular sample for microscopic analysis, including brightfield microscopy, fluorescent microscopy, electron microscopy, and the like. When used as a verb, the term "stain" shall refer to any process that results in deposition of a stain on a cellular sample.

Subject: When used as a noun, the term "subject" or "individual" is a mammal. Mammals include, but are not limited to, domesticated animals (e.g., cows, sheep, cats, dogs, and horses), primates (e.g., humans and non-human primates such as monkeys), rabbits, and rodents (e.g., mice and rats). In certain embodiments, the individual or subject is a human.

Test sample: A tumor sample obtained from a subject having an unknown outcome at the time the sample is obtained.

Tissue sample: As used herein, the term "tissue sample" shall refer to a cellular sample that preserves the cross-sectional spatial relationship between the cells as they existed within the subject from which the sample was obtained. "Tissue sample" shall encompass both primary tissue samples (i.e. cells and tissues produced by the subject) and xenografts (i.e. foreign cellular samples implanted into a subject).

Tissue specimen: Encompasses any type of biological specimen such as tissue sections, blood, cell cultures, and like biological samples, that can be mounted on a slide.

User Interface Devices: Include a display which provides for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. Embodiments of the subject matter described in this specification can be implemented in a computing system that includes a back-end component, e.g., as a data server, or that includes a middleware component, e.g., an application server, or that includes a front-end component, e.g., a client computer having a graphical user interface device or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

II-Cellular Detection System

With reference to FIG. 1, a cell detection system 10 is provided according to an exemplary embodiment of the present disclosure. The cell detection system 10 may be adapted to automatically detect the presence of cells in stained tissue images and particularly, to automatically detect and classify cells in tissue images. The cell detection system 10 generally includes an image analysis system 100 and an image acquisition system 120.

One or more digital images of a stained biological sample are acquired by an image acquisition system 120. Essentially, any suitable imaging method capable of generating a color digital image can be used. For example, an R, G, B input color image 210 (FIG. 4) of the stained tissue sample (tissue specimen or cellular sample) can be generated and stored in a storage device, such as a local computer, disc drive, solid state drive, a server machine, or the like.

Image analysis system 100 may include one or more computing devices such as desktop computers, laptop computers, tablets, smartphones, servers, application-specific computing devices, or any other type(s) of electronic device(s) capable of performing the techniques and operations described herein. In some embodiments, image analysis system 100 may be implemented as a single device. In other embodiments, image analysis system 100 may be implemented as a combination of two or more devices together achieving the various functionalities described herein. For example, image analysis system 100 may include one or more server computers and one or more client computers communicatively coupled to each other via one or more local-area networks and/or wide-area networks such as the Internet or Intranet.

Figure 2:
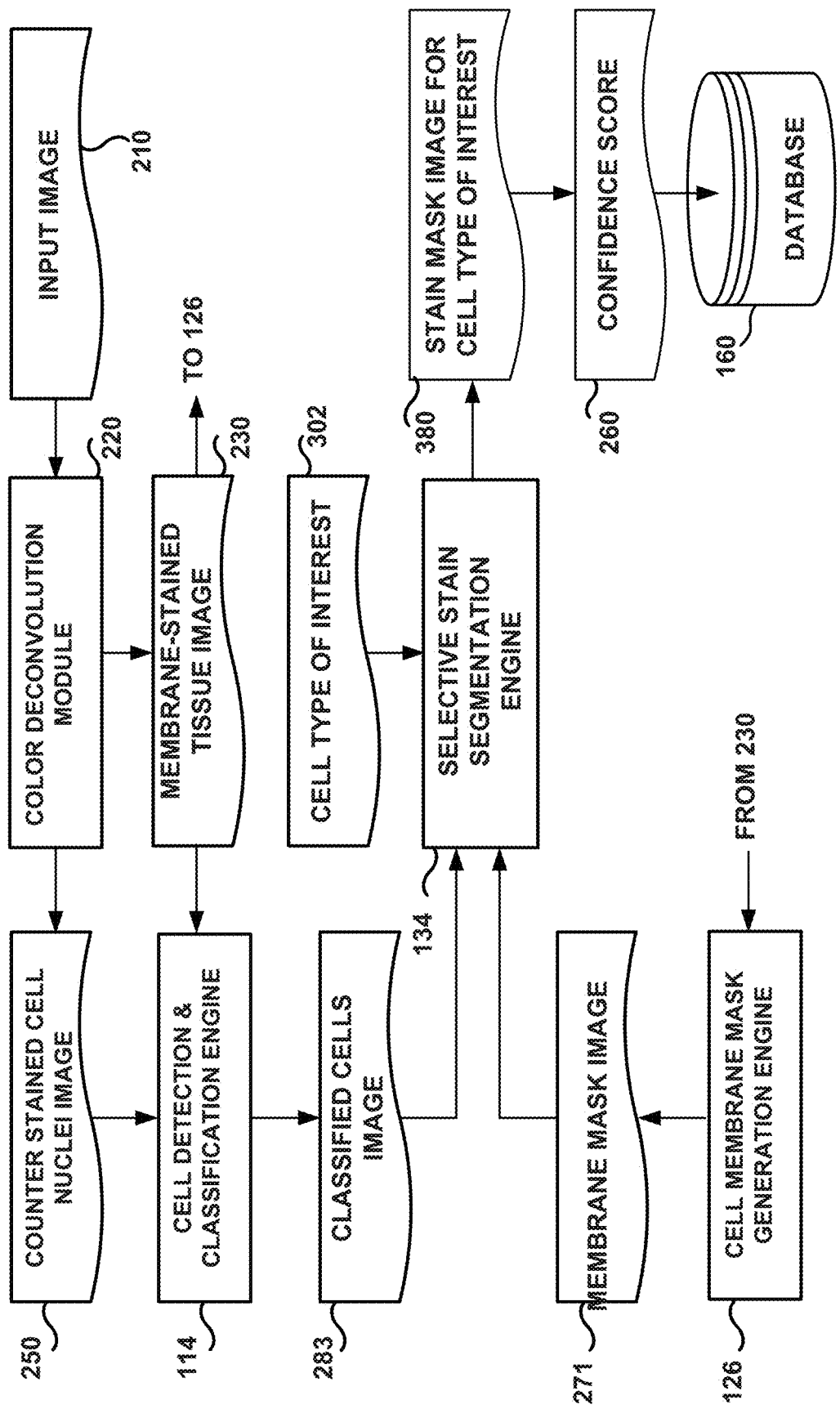
FIG. 2 is a high level block diagram of a cell classification engine, a cell membrane mask generation engine, and a selective stain segmentation engine that form part of the cellular detection system of FIG. 1, in accordance with an exemplary embodiment of the subject disclosure.

Image analysis system 100 may include a memory 115, a processor 116, and a display 117. Memory 115 may include any combination of any type of volatile or non-volatile memories, such as random-access memories (RAMs), read-only memories such as an Electrically-Erasable Programmable Read-Only Memory (EEPROM), flash memories, hard drives, solid state drives, optical discs, and the like. Memory 115 may store non-transitory computer-readable instructions for processor 116 to execute the workflows of the present disclosure at it will be described later in more detail. For brevity purposes, memory 115 is depicted in FIG. 2 as a single device, but it is appreciated that memory 115 can also be distributed across two or more devices.

Processor 116 may include one or more processors of any type, such as central processing units (CPUs), graphics processing units (GPUs), special-purpose signal or image processors, field-programmable gate arrays (FPGAs), tensor processing units (TPUs), and so forth. For brevity purposes, processor 116 is depicted in FIG. 2 as a single device, but it is appreciated that processor 116 can also be distributed across any number of devices.

Display 117 may be implemented using any suitable technology, such as LCD, LED, OLED, TFT, Plasma, etc. In some implementations, display 117 may be a touch-sensitive display (a touchscreen).

Image analysis system 100 may also include an object identifier 110, a region of interest (ROI) generator 111, a user-interface module 112, a cell classification engine 114, a cell membrane mask generation engine 126, and a selective stain segmentation engine 134. While these modules are depicted in FIG. 1 as modules, it will be evident to persons having ordinary skill in the art that each module may instead be implemented as a number of sub-modules, and that in some embodiments any two or more modules can be combined into a single module. Furthermore, in some embodiments, the image analysis system 100 may include additional engines and modules (e.g., input devices, networking and communication modules, etc.) not depicted in FIG. 1 for brevity. Furthermore, in some embodiments, some of the blocks depicted in FIG. 1 may be disabled or omitted. As it will be discussed in more detail below, the functionality of some or all the modules of the image analysis system 100 can be implemented in hardware, software, firmware, or as any combination thereof Exemplary commercially-available software packages useful in implementing modules as disclosed herein include VENTANA VIRTUOSO; Definiens TISSUE STUDIO, DEVELOPER XD, and IMAGE MINER; and Visiopharm BIOTOPIX, ONCOTOPIX, and STEREOTOPIX software packages.

After acquiring input image 210, image analysis system 100 may pass the image 210 to object identifier 110, which functions to identify and mark relevant objects and other features within image 210 that will later be used for cell classification. Object identifier 110 may extract from (or generate for) each image 210 a plurality of image features characterizing the various objects in the image as a well as pixels representing expression of the biomarker(s). The extracted image features may comprise, for example, texture features such as Haralick features, bag-of-words features and the like, including but not limited to: shape, intensity, or other statistical features. The values of the plurality of image features may be combined into a high-dimensional vector, hereinafter referred to as the "feature vector" that may be used to characterize the expression of the biomarker, a particular object, or the object location in the image. For example, if M features are extracted for each object and/or pixel, each object and/or pixel can be characterized by an M-dimensional feature vector. The output of object identifier 110 is effectively a map of the image annotating the position of objects and pixels of interest and associating those objects and pixels with a feature vector describing the object or pixels. It should be understood that the feature vector is described herein for purposes of illustration only and that the present disclosure is not limited to biomarkers; for example, the cell type may also be included.

For biomarkers that are scored on the basis of the biomarker's association with a particular type of object (such as membranes, nuclei, cells, etc.), the features extracted by object identifier 110 may include features or feature vectors sufficient to categorize the objects in the sample as biomarker-positive objects of interest or biomarker-negative markers of interest and/or by level or intensity of biomarker staining of the object. In cases where the biomarker may be weighted differently depending on the object type that is expressing it (such as immune escape biomarkers such as PD-L1, PD-L2, and IDO, which can be scored on the basis of tumor cell expression, immune cell expression, or both), the features extracted by object identifier 110 may include features relevant to determining the type of objects associated with biomarker-positive pixels. Thus, using biomarker imaging, the objects may then be categorized at least on the basis of biomarker expression (for example, biomarkerpositive or biomarker-negative cells) and, if relevant, a sub-type of the object (e.g. tumor cell, immune cell, etc.). In cases where extent of biomarker-expression is scored regardless of association with objects, the features extracted by object identifier 110 may include for example location and/or intensity of biomarker-positive pixels.

Image analysis system 100 may also pass image 210 to ROI generator 111. ROI generator 111 may be used to identify the region(s) of interest, ROI or ROIs of image 210 from which an immune context score may be calculated. In cases where the object identifier 110 is not applied to the whole image, the ROI or ROIs generated by the ROI generator 111 may also be used to define a subset of the image on which object identifier 110 is executed. In one embodiment, ROI generator 111 may be accessed through user-interface module 112. An image of the biomarker-stained sample (or a morphologically-stained serial section of the biomarker-stained sample) is displayed on a graphic user interface of the user-interface module 112, and the user annotates one or more region(s) in the image to be considered ROIs. ROI annotation can take a number of forms in this example. For instance, the user may manually define the ROI (referred to hereafter as "freeform ROI annotation").

In other examples, the ROI generator 111 may assist the user in annotating the ROI. For example, the user may annotate an edge in the image (such as, for example, a leading edge of an invasive margin of a tumor, or an edge denoting a transition from tumor core to invasive margin of a tumor), and ROI generator 111 may automatically define an ROI based on the user-defined edge. For example, the user may annotate the leading edge of the invasive margin in user-interface module 112, and the ROI generator 111 creates an ROI using the edge as a guide, for example, by drawing an ROI encompassing all objects within a predefined distance of the edge or within a predefined distance of one side of the edge. In some cases, the user may be given an option to modify the ROI annotated by ROI generator 111, such as by expanding the ROI, annotating regions of the ROI or objects within the ROI to be excluded from analysis, etc. In other embodiments, ROI generator 111 may automatically suggest an ROI without any direct input from the user (for example, by applying a tissue segmentation function to an unannotated image), which the user may then chose to accept, reject, or edit as appropriate. In some embodiments, ROI generator 111 may also include a registration function, whereby an ROI annotated in one section of a set of serial sections is automatically transferred to other sections of the set of serial sections. This functionality is especially useful when there are multiple biomarkers being analyzed, or when an H&E-stained serial section is provided along with the biomarker-labeled sections.

In some embodiments, image analysis system 100 may be communicatively coupled to image acquisition system 120. Image acquisition system 120 may obtain images of biological specimens and provide those images 210 to image analysis system 100 for analysis and presentation to the user.

Image acquisition system 120 may include a scanning platform 125 such as a slide scanner that can scan the stained slides at 20×, 40×, or other magnifications to produce high resolution whole-slide digital images, including for example slide scanners. The image acquisition system 120 may also include an H&E staining platform 124.

At a basic level, the typical slide scanner includes at least: (1) a microscope with lens objectives, (2) a light source (such as halogen, light emitting diode, white light, and/or multispectral light sources, depending on the dye), (3) robotics to move glass slides around (or to move the optics around the slide), (4) one or more digital cameras for image capture, (5) a computer and associated software to control the robotics and to manipulate, manage, and view digital slides. Digital data at a number of different X-Y locations (and in some cases, at multiple Z planes) on the slide are captured by the camera's charge-coupled device (CCD), and the images are joined together to form a composite image of the entire scanned surface. The following are exemplary methods to accomplish this task:

(1) Tile based scanning, in which the slide stage or the optics are moved in very small increments to capture square image frames, which overlap adjacent squares to a slight degree. The captured squares are then automatically matched to one another to build the composite image; and (2) Line-based scanning, in which the slide stage moves in a single axis during acquisition to capture a number of composite image "strips." The image strips can then be matched with one another to form the larger composite image.

Images generated by scanning platform 125 may be transferred to image analysis system 100 or to a server or database accessible by image analysis system 100. In some embodiments, the images may be transferred automatically via one or more local-area networks and/or wide-area networks. In some embodiments, image analysis system 100 may be integrated with or included in scanning platform 125 and/or other modules of image acquisition system 120, in which case the image may be transferred to image analysis system, e.g., through a memory accessible by both scanning platform 125 and image acquisition system 120.

In some embodiments, image acquisition system 120 may not be communicatively coupled to image analysis system 100, in which case the images may be stored on a nonvolatile storage medium of any type (e.g., a flash drive) and downloaded from the medium to image analysis system 100 or to a server or database communicatively coupled thereto. In any of the above examples, image analysis system 100 may obtain an image of a biological sample, where the sample may have been affixed to a slide and stained by histochemical staining platform 123, and where the slide may have been scanned by a slide scanner or another type of scanning platform 125. It is appreciated, however, that in other embodiments, below-described techniques may also be applied to images of biological samples acquired and/or stained through other means.

The cell detection system 10 may further include a laboratory information system (LIS) 130 and a database 160. LIS 130 typically performs one or more functions selected from: recording and tracking processes performed on samples and on slides and images derived from the samples, instructing different components of the immune context scoring system to perform specific processes on the samples, slides, and/or images, and track information about specific reagents applied to samples and or slides (such as lot numbers, expiration dates, volumes dispensed, etc.).

Figure 3:
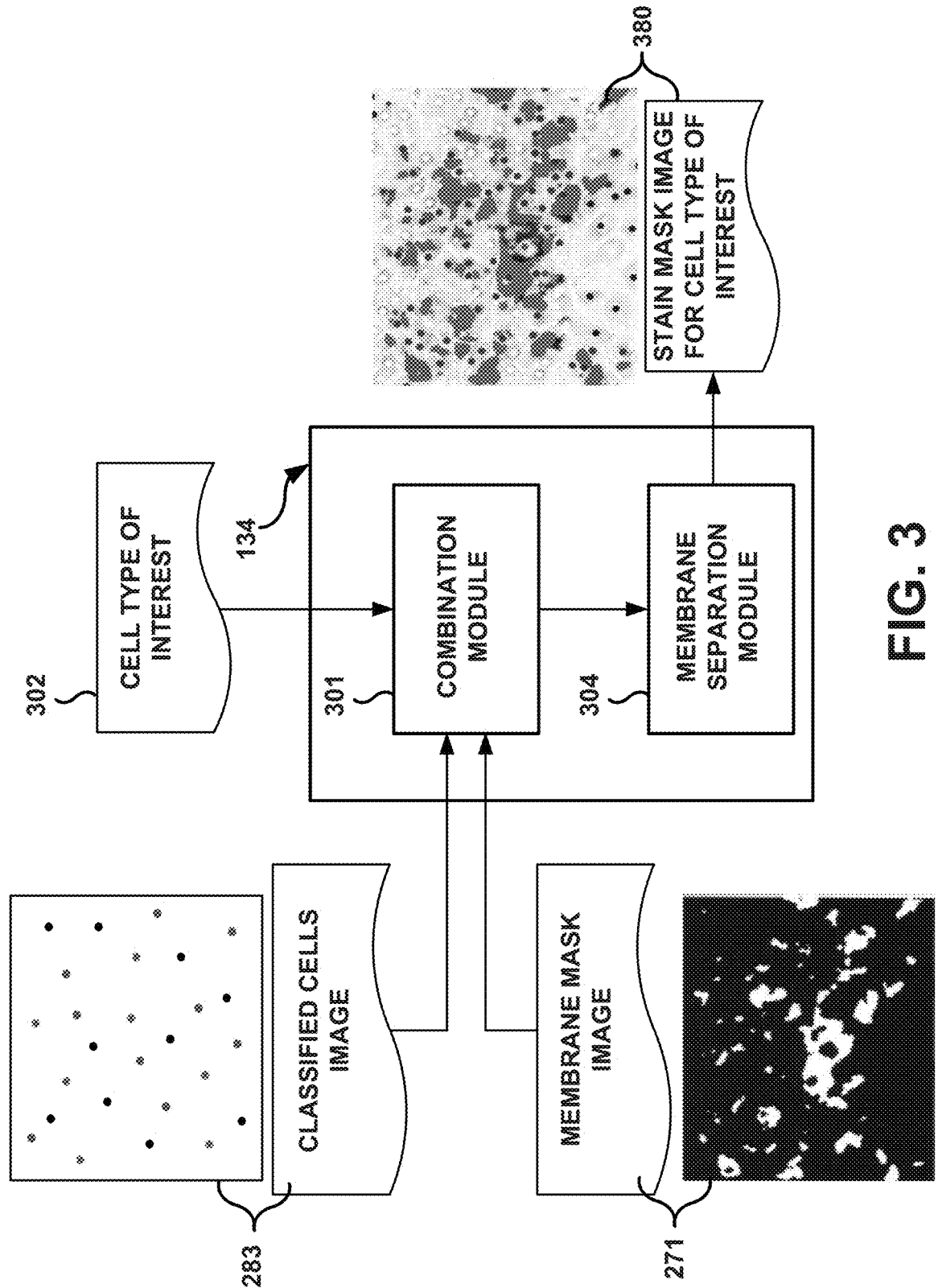
FIG. 3 is a more detailed block diagram of the selective stain segmentation engine of FIG. 2, in accordance with an exemplary embodiment of the subject disclosure.

After both the object identifier 110 and ROI generator 111 have been implemented, the cell classification engine 114 and the cell membrane mask generation engine 126 are implemented to generate a classified cells image 283 and a membrane mask image 271 (FIG. 2), respectively. The selective stain segmentation engine 134 combines the classified cells image 283 and the membrane mask image 271 based on a selected cell type of interest, as it will be described later in more detail, to generate the stain mask image 380 (used interchangeably with the term "selective stain segmentation image" herein) for the cell type of interest (FIGS. 2, 3). Upon review of the stain mask image 380 by a professional, the input image 210 is scored with a confidence score 260 (FIG. 2), indicating the likelihood that the cell belongs to the cell type being investigated. The output of selective stain segmentation engine 134 may be stored in a database, such as the database 160.

III-Stain Segmentation Engine and Workflow

Figure 4:
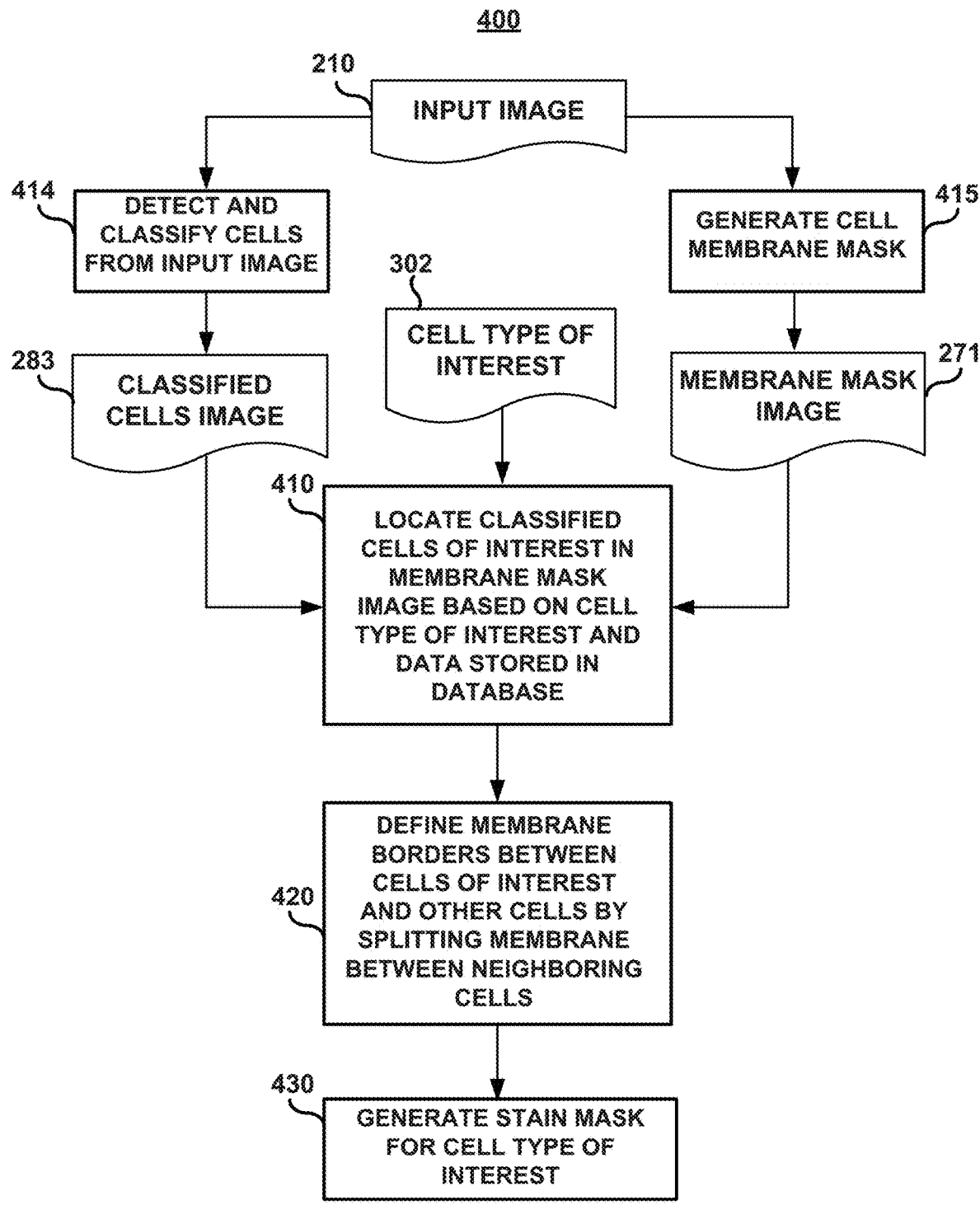
FIG. 4 is a flow chart of a workflow (or process) for selectively generating a stain segmentation image by the cellular detection system of FIG. 1, in accordance with an exemplary embodiment of the subject disclosure.

With reference to FIGS. 2 and 4, FIG. 2 illustrates a cell classification engine 114 that forms part of image analysis system 100, and FIG. 4 illustrates a workflow 400 that implements selective stain segmentation engine 134 pursuant to an exemplary embodiment of the present disclosure. Input image 210 is fed to a color deconvolution module 220 for deconvolution into two color channels that are processed separately before being combined. In this particular illustration, input image 210 is deconvoluted into two separate images: a membrane-stained tissue image 230 and a counter-stained cell nuclei image 250. As explained in detail in co-pending U.S. Provisional Patent Application Ser. No. 62/541,630, titled "Automated Methods And Systems For Detecting Cells In Stained Specimen Images," which was filed on Aug. 4, 2017, and which is incorporated herein by reference in its entirety, a complement of the membrane-stained tissue image is generated in order to clearly reflect the previously masked, light-colored nuclei. The complement image and the counter stain image are optionally normalized and then combined and segmented, to generate an output image with clearly defined nuclei. Alternatively, the complement of the membrane-stain image and the counter stain image can optionally be normalized, and then segmented prior to being combined to generate the output image. At step 414 of workflow 400, the cells in the output image may then be classified and a classified cells image 283 may be generated and stored in database 160.

With reference to FIGS. 2, 4, 5, and 6, and as further explained in detail in co-pending U.S. Provisional Patent Application Ser. No. 62/609,719, titled "System And Method For Classifying Cells In Tissue Images Based On Membrane Features," which was filed Dec. 22, 2017, and which is incorporated herein by reference in its entirety, a membrane-stained tissue image 230 may be fed to cell membrane mask generation engine 126 based on specific membrane staining patterns. At step 415 of workflow 400, membrane tissue images may be stained so that membranes of different types of cells can be stained with different patterns. The membrane staining patterns can serve as a useful source of information to classify the cells. To this end, cell membrane mask generation engine 126 helps distinguish between cells stained by, for example, two patterns that are referred to herein as elliptical pattern and punctate patterns.

Figure 5:
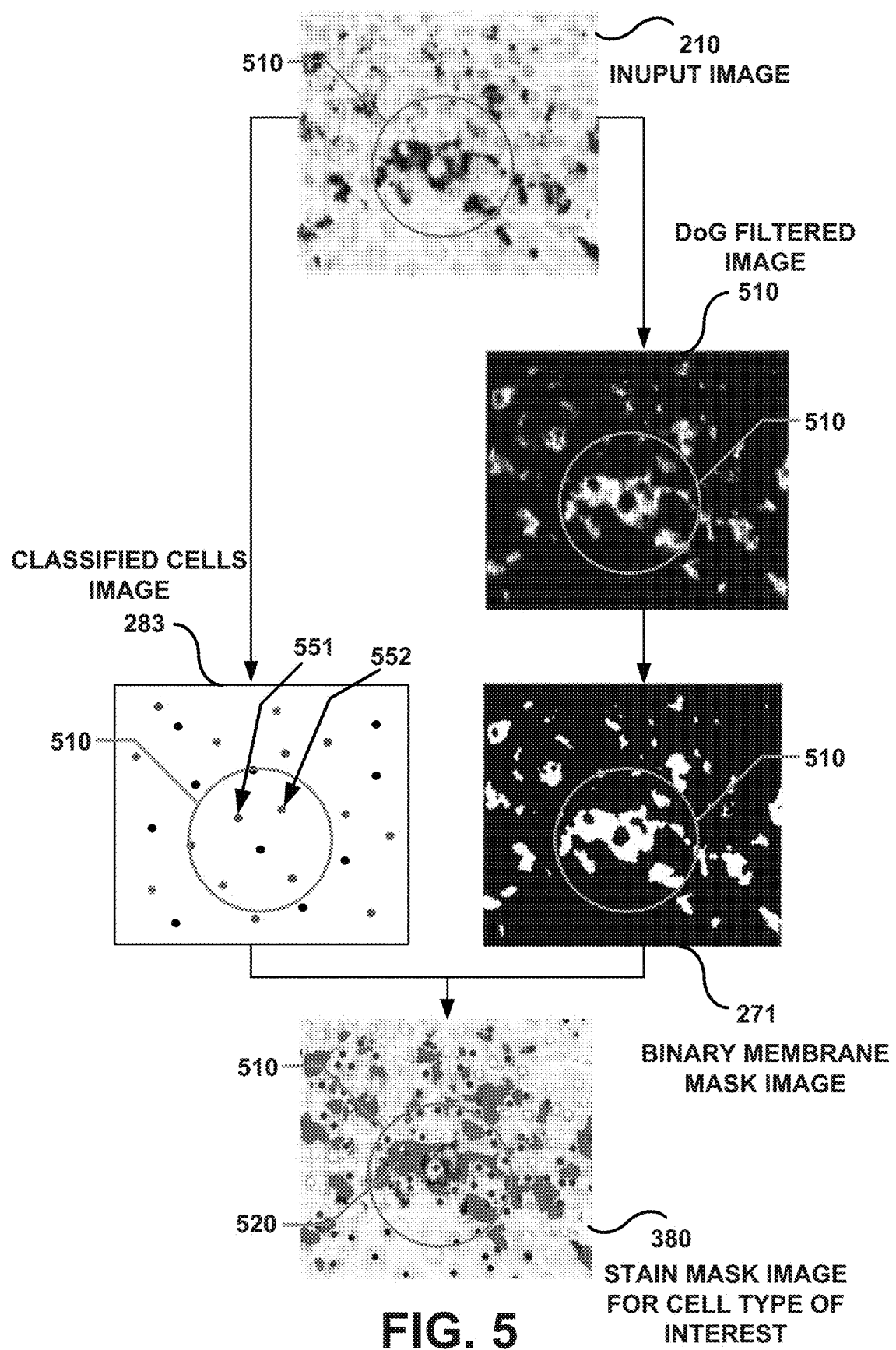
FIG. 5 depicts exemplary sequential images implemented by the workflow of FIG. 4, to generate the selective stain segmentation images, in accordance with an exemplary embodiment of the subject disclosure.

A difference of Gaussian (DoG) filter may be applied to membrane-stained image 230 to generate a DoG filtered image 505 (FIG. 5). An Otsu thresholding module may be applied to DoG filtered image 505 to generate a membrane mask image 271. Blob extraction may then be applied to the membrane mask image to extract blob objects, e.g., 630 (FIG. 6) within a sub-region (or neighborhood) of interest 610 surrounding for example a nucleus 640, by connecting the various components or features within the sub-region of interest 610. In order to further improve the discrimination between the elliptical membrane staining pattern and the punctate membrane staining pattern, a cell classification engine may compute statistical values related to the membrane blob objects for every detected cell, and may store the statistical values in database 160.

With reference to FIGS. 3, 4, and 5, selective stain segmentation engine 134 is capable of generating an ondemand selective stain mask image 380 for one or more specific cell types of interest, to the exclusion of the remaining types of cells on the tissue slide. To this end, selective stain segmentation engine 134 is adapted to segment the membrane stain associated with a specific type of cells, which would be useful in adding accuracy to the computation of the whole-slide scoring result, e.g., the confidence score 260.

In operation, classified cells image 283, membrane mask image 271, and a user-selected cell type of interest 302 are fed to a combination module 301 that forms part of selective stain segmentation engine 134. Combination module 301 may implement step 410 of workflow 400 in order to locate the classified cells of interest within membrane mask image 271 based on the classified cells image 283 stored in database 160.

More specifically, combination module 301 may implement step 410 of workflow 400 by following the exemplary sequence listed below:

Combination module 301 sets a label, such as L*, for the cell of interest 302.

For every pixel, p, within a region of interest 510 (FIG. 5) of input image 210, combination module 301 finds the closest cell c (within classified cells image 283), and determines if this closest cell c is a cell of interest 302.

If combination module 301 determines that c qualifies as a cell of interest 302, then pixel p and other similar pixels are identified as a region of interest 520 (FIG. 5), which is then marked by an identifiable color, such as the green color shown in stain mask image 380.

Although the generation of stain mask image 380 for a specific cell type of interest 320, represents in and of itself a significant improvement over conventional methods, the present disclosure aims at further improving the accuracy of stain mask image 380 by feeding it to a membrane separation module 304 (FIG. 3). Membrane separation module 304 may implement step 420 of workflow 400 (FIG. 4) to further define the membrane borders of the identified cells of interest 302, by splitting the shared membrane components between neighboring cells of interest 302, and to generated a final enhanced stain mask image at step 430 of workflow 400.

Figure 6:
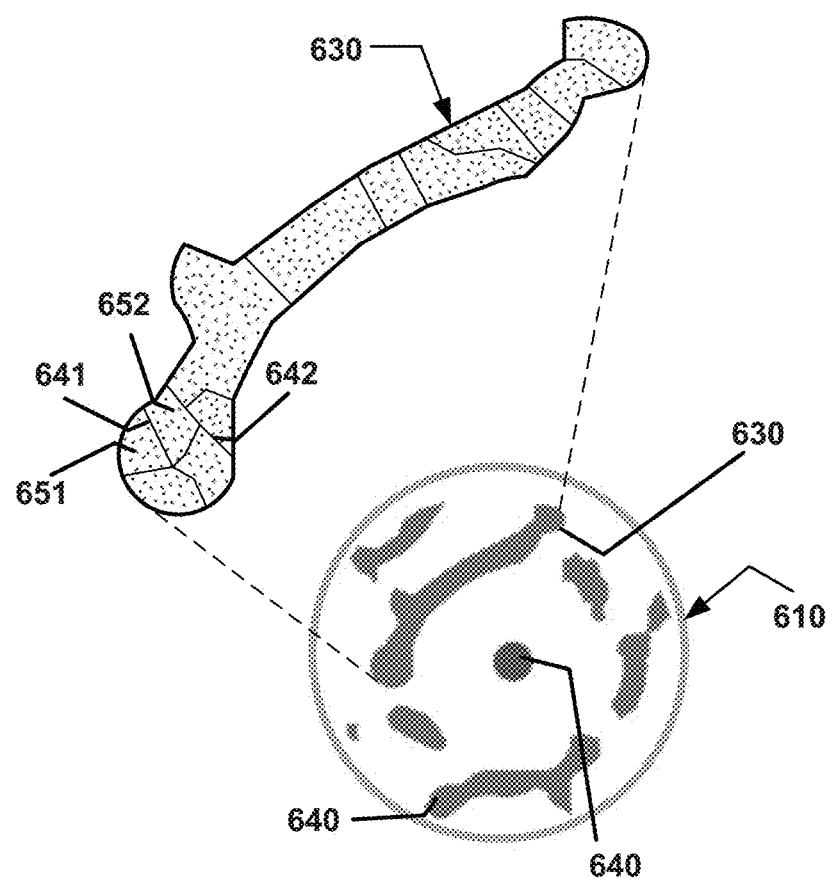
FIG. 6 illustrates an enlarged view of a cell membrane segment that has been split between two adjacent cells (corresponding to the blue 652 and red 651 colors) based on a Voronoi-like diagram within the workflow of FIG. 4, in accordance with an exemplary embodiment of the subject disclosure.

FIG. 6 illustrates a sub-region of interest 610 comprising a red-colored cell 552 for which cell membrane mask generation engine 126 has identified the various membrane components, e.g., 630, 640, and wherein combination module 301 has marked these membrane components 630, 640 in a distinctive green color. For added accuracy, membrane separation module 304 (FIG. 3) can be implemented to further define the borders or boundaries, e.g., 641, 642, between two adjacent cells, such as the red-colored cell 552 and a nearby blue-colored cell 551 that belong to different classes, within the region of interest 510 of FIG. 5.

To this end, membrane separation module 304 calculates the optimal split of the membrane components between the neighboring cells of different classes 551, 552. The split (or separation) may be performed based on the most optimal energy as defined appropriately However, if additional biological information is or becomes available, then the split will account for such additional biological information. In one embodiment, membrane separation module 304 may split the shared area of interest between the neighboring cells 551, 552, equally.

Figure 7:
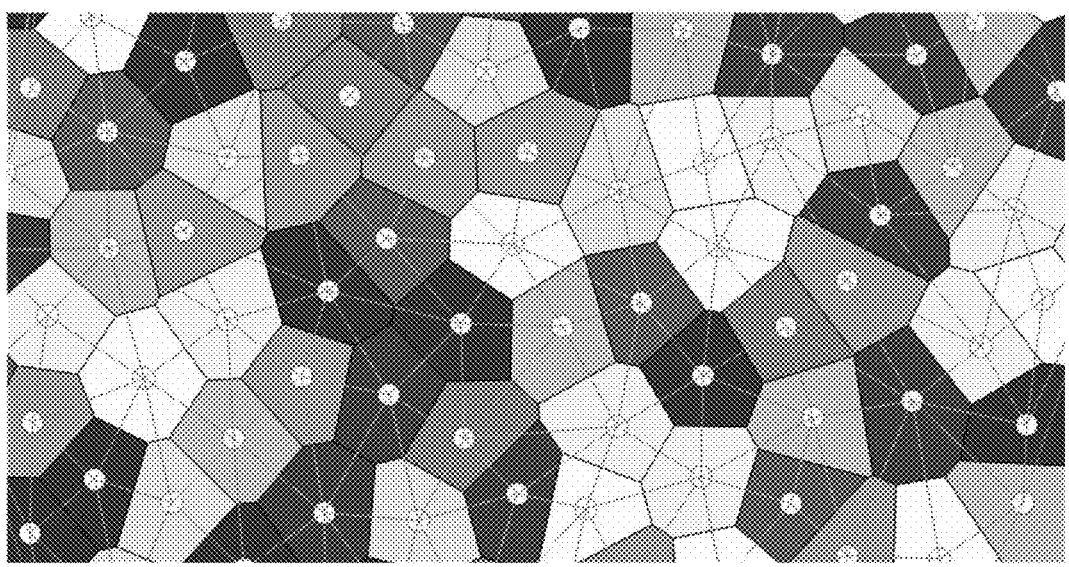
FIGS. 7 and 8 are enlarged illustrations of Voronoi-split objects existing in the real world, in accordance with an exemplary embodiment of the subject disclosure.
Figure 8:
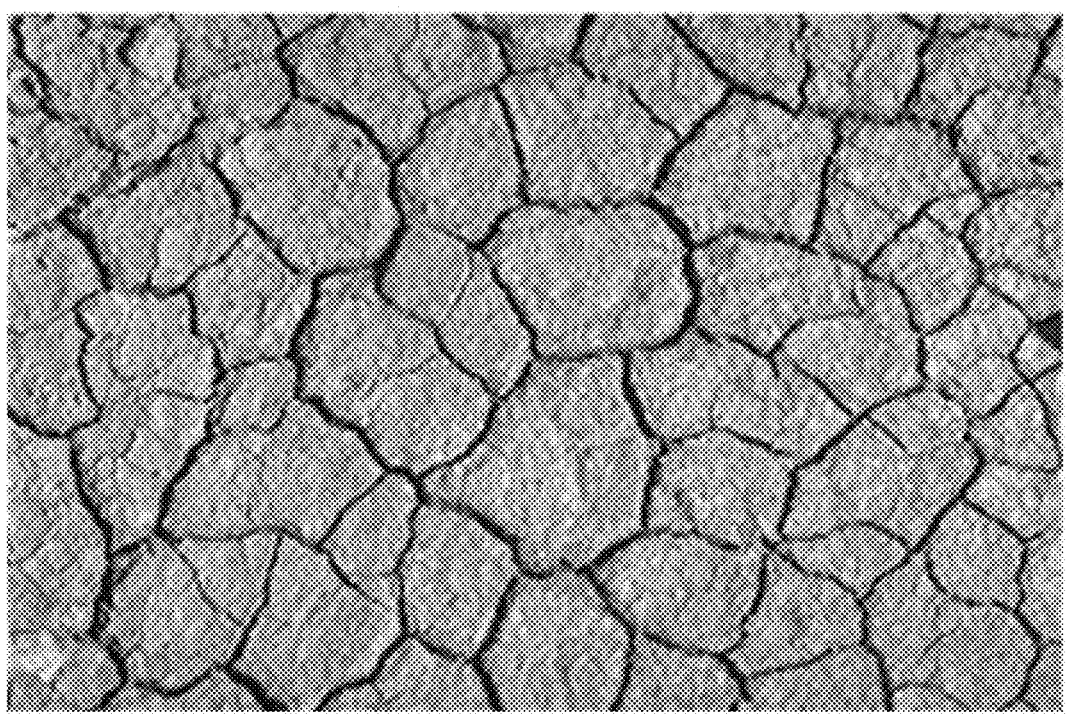

In another embodiment that is represented in FIGS. 7 and 8, membrane separation module 304 performs the split based on a Voronoi diagram. According to the Voronoi diagram, the region of interest, which in this case includes membrane component 630, is partitioned into smaller contiguous areas, e.g., 651, 652, based on their distances to the neighboring cells 551, 552. It should be understood that the Voronoi diagram is used herein for illustration purpose, and that other suitable splitting methods may alternatively be used. FIG. 7 illustrates a representative illustration of a Voronoi-like mask 700 generated by membrane separation module 304, which becomes part of stain mask image 380. FIG. 8 illustrates a dried up piece of soil that splits optimally based on the energy stored in the soil.

Figure 9:
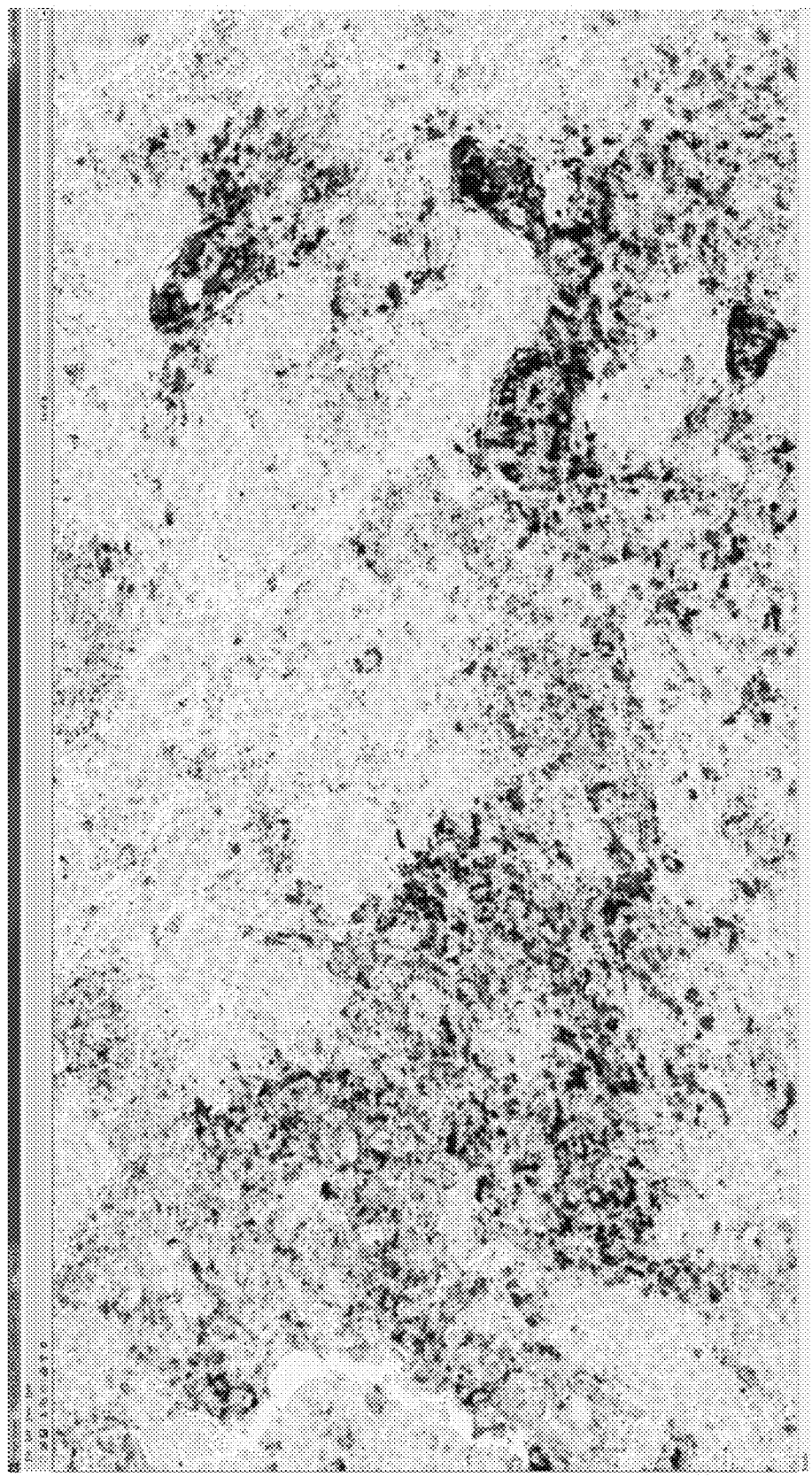
FIG. 9 is a screen shot of an illustrative stain mask image (green overlay, 910) associated with a specific cell class (i.e. positive immune cells), as generated by the selective stain segmentation engine of FIG. 3 to differentiate this specific class of cells from the remaining DAB-stained (e.g., positive tumor cells) cell classes, in accordance with an exemplary embodiment of the subject disclosure.

FIG. 9 illustrates a screen shot (also referred to as a Voronoi split DAB mask overlay) 900 of a representative input tissue slide image 210, providing a visualization of the differentiation between the cells classes, with the cells class of interest being distinguished with a green mask (910). It should be appreciated that prior to the advent of the present disclosure, the entire input tissue slide image 210 would be in the same (e.g., a brown, DAB) color (912), and would not clearly and visually distinguish the various classes of cells of interest.

In each of the flow charts described herein, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, the use of a specific sequence of steps is not meant to imply any limitations on the invention. Changes may be made with regards to the sequence of steps without departing from the spirit or scope of the present invention. The use of a particular sequence is therefore, not to be taken in a limiting sense, and the scope of the present invention is defined only by the appended claims.

As it will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As it will be further appreciated, the processes in embodiments of the present invention may be implemented using any combination of software, firmware or hardware. As a preparatory step to practicing the invention in software, the programming code (whether software or firmware) will typically be stored in one or more computer readable storage mediums for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while illustrative embodiments of the present invention are described in the context of a fully functional computer (server) system with installed (or executed) software, those skilled in the art will appreciate that the software aspects of the illustrative embodiments of the present invention are capable of being distributed as a program product in a variety of forms, and that an illustrative embodiment of the present invention applies equally regardless of the particular type of media used to actually carry out the distribution.

In addition, while the present invention has been described with reference to exemplary embodiments, it will be understood by those skilled in the art that various changes may be made and equivalents may be substituted for elements thereof without departing from the scope of the invention. Furthermore, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another. In addition, listing terms such as "a," "b," "c," "first," "second," and "third," are used herein and in the appended claims for purposes of description and are not intended to indicate or imply relative importance or significance.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of generating selective stain segmentation images for at least one cell type of interest within a stained tissue image, the method comprising:
   accessing a tissue image that represents at least a part of a tissue of a subject;
   separating color channels of the tissue image to identify a membrane-stained image that identifies one or more membrane staining patterns of the tissue and a counter-stained cell nuclei image that identifies one or more nuclei of the tissue;
   processing the one or more membrane staining patterns in the membrane-stained image to generate a membrane mask image;
   classifying, based on the one or more nuclei, cells detected in the counter-stained cell nuclei image to generate a classified cells image; and
   generating selective stain segmentation images for said at least one cell type of interest based on the membrane mask image and the classified cells image, wherein generating the selective stain segmentation images includes:
      locating classified cells of interest within the membrane mask image; and
      defining membrane borders between the classified cells of interest and other cells by splitting shared membrane components between neighboring cells.

2. The method of claim 1, further including generating a visual image analysis of the generated selective stain segmentation images.

3. The method of claim 1, wherein splitting shared membrane components between neighboring cells includes performing a split based on a Voronoi diagram.

4. The method of claim 1, wherein the tissue image is generated from a stained pathology tissue slide; and wherein generating selective stain segmentation images for said at least one cell type of interest further includes separating neighboring biomarker stains within the stained pathology tissue slide.

5. The method of claim 1, wherein classifying the cells includes identifying a region of interest proximate to a pixel labeled as a cell of interest.

6. The method of claim 1, wherein classifying the cells includes classification based on specific biomarkers.

7. The method of claim 6, wherein classification based on specific biomarkers includes determining a type of image objects associated with any of biomarker-positive pixels or biomarker-negative pixels.

8. An image analysis system for generating selective stain segmentation images for at least one cell type of interest within a stained tissue image, the system comprising:
 a color deconvolution engine for:
  accessing a tissue image that represents at least a part of a tissue of a subject; and
  separating color channels of the tissue image to identify a membrane-stained image that identifies one or more membrane staining patterns of the tissue and a counter-stained cell nuclei image that identifies one or more nuclei of the tissue;
 a cell membrane mask generation engine for processing the one or more membrane staining patterns in the membrane-stained image to generate a membrane mask image;
 a cell classification engine for classifying, based on the one or more nuclei, cells detected in the counter-stained cell nuclei image to generate a classified cells image; and
 a selective stain segmentation engine for generating selective stain segmentation images for said at least one cell type of interest based on the membrane mask image and the classified cells image of the cells, wherein the selective stain segmentation engine generates the selective stain segmentation images by:
  locating classified cells of interest within the membrane mask image; and
  defining membrane borders between the classified cells of interest and other cells by splitting shared membrane components between neighboring cells.

9. The system of claim 8, wherein the selective stain segmentation engine generates a visual image analysis of the generated selective stain segmentation images.

10. The system of claim 8, wherein the cell classification engine classifies the cells by identifying a region of interest proximate to a pixel labeled as a cell of interest.

11. The system of claim 8, wherein the cell classification engine classifies the cells based on specific biomarkers.

12. The system of claim 11, wherein classification based on specific biomarkers includes determining a type of image objects associated with any of biomarker-positive pixels or biomarker-negative pixels.

13. The system of claim 8, wherein splitting shared membrane components between neighboring cells includes performing a split based on a Voronoi diagram.

14. The system of claim 8, wherein the tissue image is generated from a stained pathology tissue slide; and wherein generating selective stain segmentation images for said at least one cell type of interest further includes separating neighboring biomarker stains within the stained pathology tissue slide.

15. A non-transitory computer-readable medium including instructions which, when executed by one or more processors, cause the one or more processors to perform a plurality of operations for generating selective stain segmentation images for at least one cell type of interest within a stained tissue image, the instructions comprising:
 accessing a tissue image that represents at least a part of a tissue of a subject;
 separating color channels of the tissue image to identify a membrane-stained image that identifies one or more membrane staining patterns of the tissue and a counter-stained cell nuclei image that identifies one or more nuclei of the tissue;
 processing the one or more membrane staining patterns in the membrane-stained image to generate a membrane mask image corresponding to the tissue image;
 classifying, based on the one or more nuclei, cells detected in the counter-stained cell nuclei image to generate a classified cells image; and
 generating selective stain segmentation images for said at least one cell type of interest based on the membrane mask image and the classified cells image of the cells, wherein generating the selective stain segmentation images includes:
  locating classified cells of interest within the membrane mask image; and
  defining membrane borders between the classified cells of interest and other cells by splitting shared membrane components between neighboring cells.

16. The non-transitory computer-readable medium of claim 15, wherein the instructions further comprises generating a visual image analysis of the generated selective stain segmentation images.

17. The non-transitory computer-readable medium of claim 15, wherein splitting shared membrane components between neighboring cells includes performing a split based on a Voronoi diagram.

18. The non-transitory computer-readable medium of claim 15, wherein the tissue image is generated from a stained pathology tissue slide; and wherein generating selective stain segmentation images for said at least one cell type of interest further includes separating neighboring biomarker stains within the stained pathology tissue slide.

19. The non-transitory computer-readable medium of claim 15, wherein classifying the cells includes identifying a region of interest proximate to a pixel labeled as a cell of interest.

20. The non-transitory computer-readable medium of claim 15, wherein classifying the cells includes classification based on specific biomarkers.

* * * * *